INVENTORS.
WILLIAM F. GOETTER
ROBB L. MILLHAM
BY Joseph P. Kates
ATTORNEY

Nov. 27, 1962 W. F. GOETTER ET AL 3,066,210

POWER OSCILLATOR

Filed Feb. 29, 1960

2 Sheets-Sheet 2

INVENTORS.
WILLIAM F. GOETTER
ROBB L. MILLHAM
BY
Joseph P. Kates
ATTORNEY

United States Patent Office 3,066,210
Patented Nov. 27, 1962

3,066,210
POWER OSCILLATOR

William F. Goetter, Baldwinsville, and Robb L. Millham, Liverpool, N.Y., assignors to General Electric Company, a corporation of New York Filed Feb. 29, 1960, Ser. No. 11,652
8 Claims. (Cl. 219—10.55)

Figures 1, 2, 5:
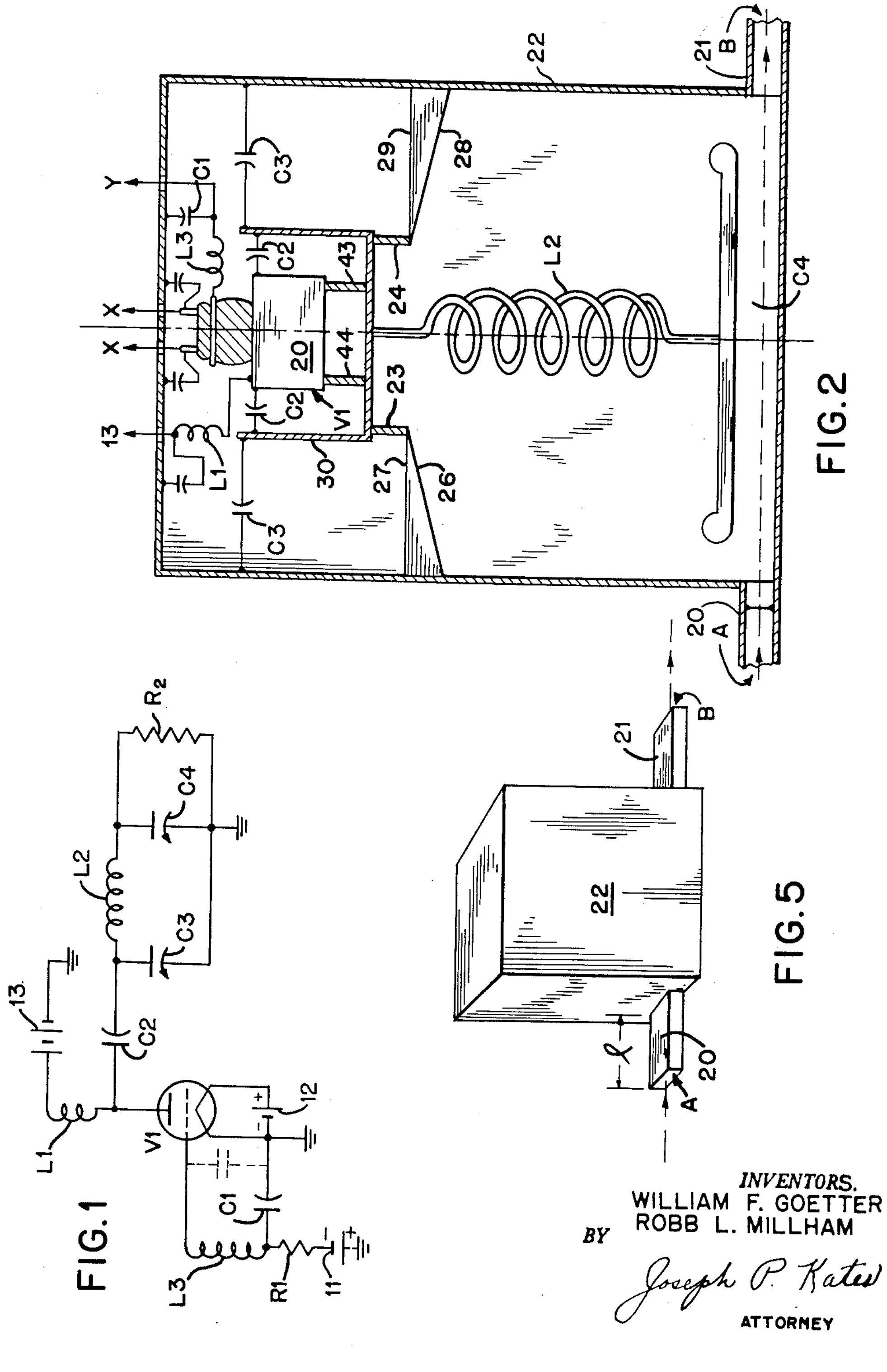

The present invention relates to dielectric heating and more particularly relates to a power oscillator and associated work circuit for industrial dielectric heating of a substance or material by radio frequency energy.

Dielectric heaters for industrial processing of materials have taken various forms due to the wide variety of materials and processes to which they have been applied. Prior art systems of dielectric heating systems and applications are exemplified by the apparatus shown in U.S. Patent No. 2,783,344 of H. R. Warren for "Dielectric Heating Systems and Applicators" issued Feb. 26, 1957, and the apparatus described in other patents of the same inventor, namely U.S. Patent No. 2,783,347 issued Feb. 26, 1957, for "High-Frequency Heating Systems and Applicators," U.S. Patent No. 2,783,346 for "High-Frequency Heating Applicators," U.S. Patent No. 2,783,345 for "High-Frequency Heating Applicators," and the apparatus disclosed in C. E. Elsworth's Patent No. 2,732,474 issued January 24, 1956, for "Variable Capacitor for High-Frequency Dielectric Heating Applicator." The present invention solves some important problems to overcome disadvantages of prior art systems. For example, in prior art systems the RF (radio frequency) voltage available from the radio frequency generator was not obtainable over a sufficiently wide range, maximum power transfer or optimum efficiency was not provided, radiation of radio frequency energy caused losses, the circuitry provided was not sufficiently selective for maximum efficiency in transfer of energy from the radio frequency generator to the work circuit, the work circuit area was not heated uniformly due to lack of uniformity of the radio frequency voltage applied throughout the various portions of the work circuit area, high power output was difficult to obtain at high frequencies, and adjustability of frequency for variants such as for optimum frequency for each different material was not provided.

The present invention overcomes these and other heretofore unsolved problems causing deficiencies in performance or desired better performance in prior art devices. The invention described herein comprises a very simple radio frequency generating circuit comprising a tuned-grid, tuned-plate, oscillator which incorporates a frequency determining circuit of the form of a pi network to aid in impedance matching between the anode of the tube of the power oscillation generator and the load without resorting to the use of double-coupled circuits. In the present invention transformation may be made to present a load resistance to the oscillator tube which is higher or lower than the output load resistance depending upon whether the ratio of capacitances in the pi filter is less than or greater than unity. The dielectric of one of the capacitors of the pi network is the work material itself. The pi network makes it possible to adjust the voltage between the plates of the work circuit to a greater or lesser value than the radio frequency voltage at the anode of the tube and the entrance and exit ducts for the work is of dimensioning, shape or configuration and location such that radiation from the circuit through the wave guide of energy not used for the work is negligible. Because of proper choice of length and surge impedance in the inventive circuit desirable frequency of operation is obtained and circuit Q or selectivity is increased to optimum value for good overall efficiency of operation. Because of symmetrical circuit configuration, equal distribution of RF current to the work is presented thereby providing essentially equal voltage throughout the work circuit area. In addition, by paralleling smaller high frequency tubes in one embodiment of the invention, impedance transforming characteristics and ability to multiply voltage is made possible so that work circuit voltage becomes a multiple of the tube anode voltage. The invention further provides a device of inherent simplicity of operation and which eliminates need for coupled circuits and for adjustment during operation.

An object of the present invention is to provide a power oscillator and associated work circuit for industrial dielectric heating applications which will provide for adjusting the work circuit RF (radio frequency) voltage over a very wide range including voltages of greater value than those normally obtained from a power oscillator.

Another purpose of the present invention is to provide a power oscillator and associated work circuit for industrial dielectric heating which will incorporate means for matching the load circuit to the radio frequency generator or power oscillator for maximum power transfer and optimum efficiency.

Another aim of the present invention is to provide a power oscillator and associated work circuit for dielectric heating which will provide complete circuit shielding with low external radiation of radio frequency energy.

Another object of the present invention is to provide dielectric heating apparatus incorporating circuitry of high selectivity or high Q so as to effect efficient transfer of energy from a radio frequency generator to the work circuit.

Another purpose of the present invention is to provide a high frequency power generator and associated work circuit for dielectric heating wherein uniformity of radio frequency voltages throughout the work circuit area is provided.

Another aim of the present invention is to provide a power oscillator and associated industrial dielectric heating work circuit which will provide for practical operation of radio frequency generating tubes in parallel to obtain high frequency high power output in the work circuit.

Another purpose of the present invention is to provide a power oscillator and associated work circuit for dielectric heating which will provide simplicity of adjustment and operation.

Another object of the present invention is to provide a simple power oscillator circuit for industrial dielectric heating capable of transforming load resistance presented to the anode of the generator with optimized load matching; omitting use of double-coupled circuits; and providing proper matched impedance, so that substantially the entire load loss occurs in the work material with no appreciable dissipation of energy for purposes other than load (i.e. no dissipation for "no load" purposes); which will have proper shielding; which will permit feeding of the work into and out of the inventive apparatus; which will provide means to prevent radiation from the heat source; wherein proper and simple adjustment in frequency is possible with change in material by proper choice of length and surge impedance to increase circuit Q or selectivity and therefore overall efficiency of operation; wherein RF (radio frequency) currents flow to the work with equal distribution of voltage throughout the work circuit area; wherein frequency and power extension of operation may be provided by paralleling a plurality of smaller high frequency tubes; and wherein advantages of impedance transforming and ability to multiply voltage and symmetrical construction for proper grouping of tubes is provided.

Figures 3, 4:
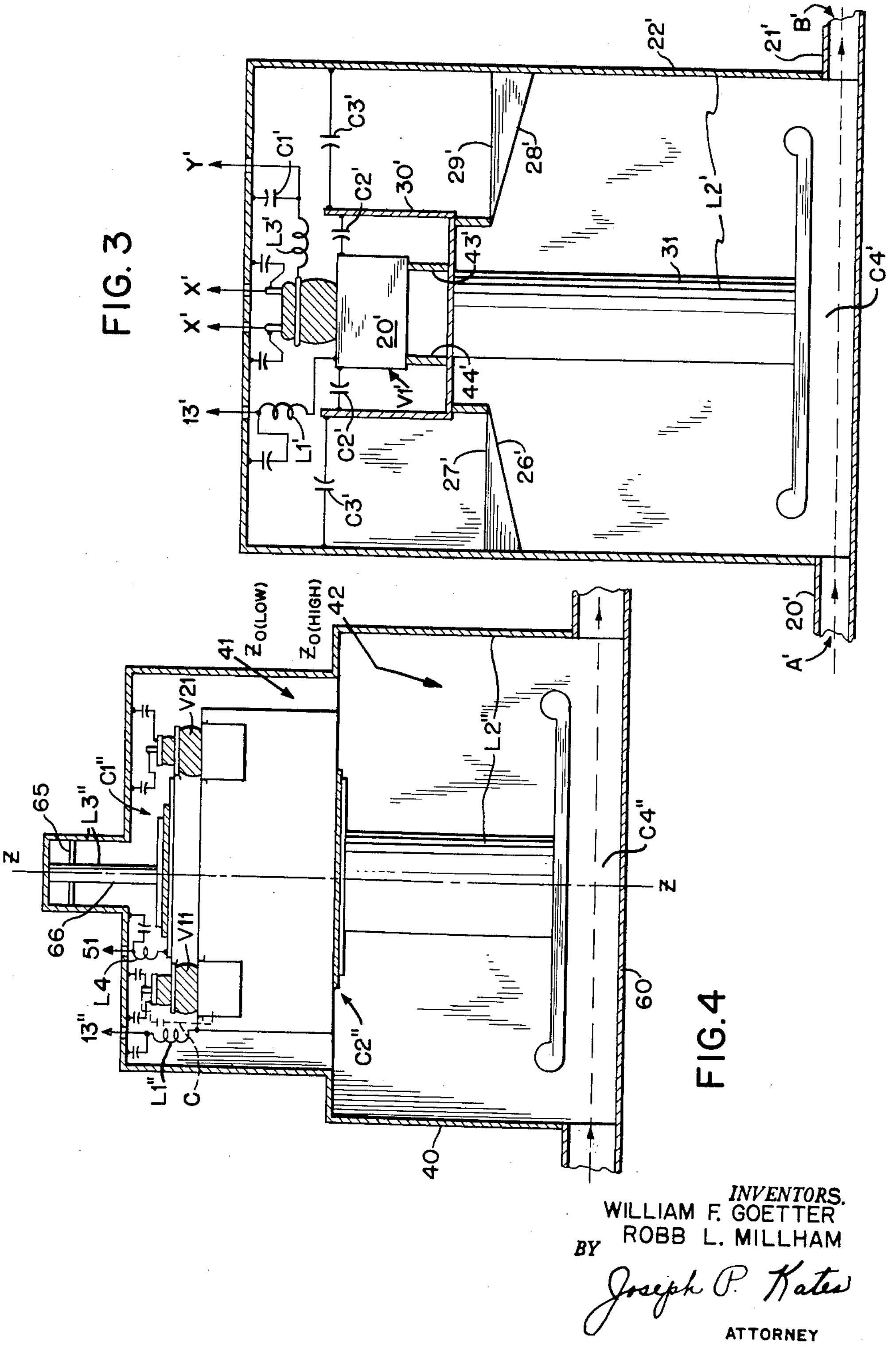

While the novel and distinctive features of the invention are particularly pointed out in the appended claims, a more expository treatment of the invention, in principle and in detail, together with additional objects and advantages thereof is afforded by the following description and accompanying drawing in which:

FIG. 1 is a schematic representation of a first illustrative embodiment of a circuit of the present invention, FIG. 2 is a partially mechanical and partially electrical schematic representation pictorially illustrating details and operation of the circuit of FIG. 1, FIG. 3 is a schematic representation of a second embodiment of the invention wherein the frequency of operation is so high that the inductor or coil of the pi filter has become a straight connection between the capacitors of the filter and has degenerated into a coaxial transmission line, the connection being the inner conductor and the shield, the outer conductor of that line with repetitive detailed portions broken away, FIG. 4 is a cross-sectional pictorial schematic representation similarly illustrative of another embodiment of the invention and which utilizes transmission line elements for both the plate and grid circuits and FIG. 5 is a representation of a physical embodiment of the outer shell and the wave guide duct projecting therefrom through which the dielectric material is passed.

Materials that do not conduct electricity may be heated by applying power at frequencies above a thousand kilocycles (kc.) or one megacycle. Since conducted current does not pass through the material, high voltage may be applied across the material by placing it between parallel metal plates. When the output leads of a very high frequency power oscillator are connected to such plates the work material becomes stressed by the high voltage field. Rapid reversal of this field distorts and agitates the molecular structure of the material to generate heat uniformly through all parts of the material by the internal molecular friction. By this means the times for heating thick layers of insulating material may be greatly shortened even though the material is a poor thermal conductor (does not permit heat to travel through itself).

This arrangement resembles a capacitor in that the work material is the dielectric or insulating material between the high voltage plates of the capacitor. Induction heating depends on the square of the current ($I^2$) induced within the work piece. By way of comparison dielectric heating depends on the square of the voltage ($E^2$) applied across the material. For example, 2000 to 5000 volts is required per inch of thickness of material at frequencies in the neighborhood of between 3 to 30 megacycles. Such dielectric heating may be used for drying glue between wood layers in manufacturing plywood, sterilizing bulk foods while sealed in their final containers, frying frozen foods and cooking if done uniformly and rapidly, sewing plastic fabrics by pressing them together between high frequency plates, preheating plastic material for molding and shaping within large presses, and producing artificial fever for medical treatment. In industrial electric heating materials may be heated faster and cleaner and the heating may be accurately controlled in an economical fashion. The heat is produced inside a conducting material by induction heating or inside a non-conducting material by dielectric heating. These two processes require high frequency A.-C. power vacuum tube oscillators for supplying frequencies above 10 kilocycles (usually in the neighborhood of 1 to 50 megacycles). One problem solved by the invention therefore is to provide a power oscillator circuit operating at high frequency with sufficient power generated at such high frequencies. Another problem is to couple that high frequency energy with minimum loss of energy in transmission to a device for radiating the power into the object which is to be attacked by the high power radiation. The radio frequency generating circuit utilized is basically a tuned-grid, tuned-plate oscillator using a suitable power type vacuum tube. In the grid circuit an inductor and capacitor is chosen to be resonant at a frequency somewhat higher than the desired output frequency and in the plate circuit the capacitors and inductors are chosen to be resonant at the desired output frequency. There is no transformer action between the plate and grid inductances but the necessary grid signal passes through the tube directly from anode to grid because of interelectrode capacity between anode and grid wherein rapid changes of anode voltage cause similar voltage changes at the grid such that part of the anode output voltage is fed back to the grid through the tube itself.

Now referring to FIG. 1 the radio frequency generating circuit may be a tuned-grid, tuned-plate oscillator comprising amplifier type vacuum tube stage V1. Tube V1 may be a triode and may comprise an anode, a control electrode and a cathode. Filament heating voltage may be provided by a voltage source 12. Control electrode or grid bias may be provided by the negative voltage source 11 and the anode D.-C. supply may be provided by a source 13. Disposed between the control electrode of stage V1 and the source 11 may be an inductor L3 which in combination with the grid to cathode capacitance of tube V1 shown in dashed lines comprises the tuned-grid circuit of tuned grid, tuned-plate oscillator stage V1. Disposed between the inductor L3 and the voltage source 11 may be a grid leak bias resistor R1. Disposed between the junction of resistor R1 and inductor L3 and the filament of stage V1 may be a blocking capacitor C1. Flowing through resistor R1 is the rectified grid current of the tube to derive direct current bias for the grid from generated oscillations. Disposed between the anode source 13 and the anode of stage V1 may be an inductor L1. Inductor L1 may be a choke coil having a very high impedance at the frequency of operation of stage V1. The D.-C. direct current voltage is supplied to the anode of stage V1 through coil or inductor L1. Inductor L1 thus prevents the radio frequency plate power from reaching the power supply. The anode radio frequency circuit of stage V1 (which is the frequency-determining circuit) may be composed of capacitors C3 and C4, an inductor L2 and a load resistance $R_2$ which represents the resistance causing power loss in the material or substance which is processed by the dielectric heating circuit. Capacitor C3 and C4 in conjunction with inductor L2 forms a "pi" network. Disposed between the pi network comprising capacitors C3 and C4 and inductor L2 and the anode of tube V1 may be a blocking capacitor C2. Blocking capacitors C1 and C2 are of size to present negligible impedance to the flow of radio frequency current at the frequency of operation of stage V1 thereby being bypassing capacitors at that frequency while blocking D.-C. Inductor L1, the anode choke coil, presents a very high impedance at the frequency of operation of stage V1 and thereby prevents radio frequency from appearing in the power supply source 13. Capacitor C2 has one end connected to the anode of stage V1 and has its other end connected to one plate of capacitor C3, the other plate of capacitor C3 being connected to ground. Inductor L2 and capacitor C4 respectively are connected in series with each other and disposed across capacitor C3. That is, capacitor C4 has one plate grounded and its other plate is connected to inductor L2, the opposite end of inductor L2 being connected to the ungrounded plate of capacitor C3. Load resistance $R_2$ is shown as disposed across capacitor C4. Stage V1 and associated components operate as a tuned-grid, tuned-plate oscillator wherein a tuned circuit appears in each of the grid and anode circuits. The anode coil L2 and the grid coil L3 are located so that there is no inductive coupling between them. Voltage from the anode circuit is fed back to the grid circuit through the interelectrode capacitance existing between the plate and the grid of stage V1.

The anode radio frequency circuit of stage V1 (which is the frequency-determining circuit) may be composed of capacitors C3 and C4, inductor L2 and the load $R_2$ which represents the dielectric loss or power loss in the material or substance (dielectric) which is processed by the dielectric heating circuit. A characteristic of the pi network formed by capacitors C3 and C4 and inductor L2 which is important herein is that the network provides a simple means of transforming the resistance of load $R_2$ to a different value at the anode of tube V1 so as to obtain an optimized load for stage V1 without resorting to double-coupled circuits. The transformation may be either to present a load resistance to stage V1 which is a higher or lower value of resistance than the load resistance designated as resistor $R_2$ depending upon whether the ratio of the capacitances of capacitor C3 to capacitor C4 is less than or greater than unity. Expressed mathematically, $$\frac{R_P}{R_2} \cong \frac{X_{C3}}{X_{C4}}$$

where $R_P$=resistance presented at plate or anode of tube V1
$R_2$=load resistance
$X_{C3}$=capacitive reactance of capacitor C3
$X_{C4}$=capacitive reactance of capacitor C4 and "$\cong$" means "is approximately equal."

The load loss in the work material represented schematically by resistor $R_2$ is the dielectric loss in the material which occurs when the material is placed in a high-gradient radio frequency electric field. It is of course desirable that this power loss in the dielectric be as high as possible for maximum heating efficiency. In the present invention such a field is made to exist between the plates of capacitor C4. Capacitor C4 comprises two conducting plates between which the work material is placed. The work material may or may not be in actual contact with the capacitor plates. Since the dielectric loss in the material is a result of the radio frequency electric field, the rate of power transfer to the material is a function of the voltage between the plates of the work circuit of capacitor C4. The pi network shown in FIG. 1 makes it possible to adjust this voltage to a greater or lesser value than the radio frequency voltage at the anode of stage V1. This follows from the impedance transformation involved in the above expression of ratios of the capacitive reactances of capacitors C3 and C4 respectively to the ratio of the anode load of stage V1 to the load resistance of the dielectric.

Now referring to FIG. 2, the filament voltage may be applied across the input filament leads XX from the voltage source 12 (shown in FIG. 1). Negative bias is provided from voltage source 11 (shown in FIG. 1) to the contact point Y and through inductor L3 which is connected to the grid of stage V1. RF choke L1 is disposed between the high voltage source 13 (shown in FIG. 1) and the plate of stage V1. Capacitor C2 is represented as a pair of capacitors leading from the plate 20 to a conductive portion 30. Insulators 23 and 24 may be disposed between supports 26, 27, 28 and 29 which are connected to the shield 22 and the conductive portion 30. Conductive portion 30 may be of U-shape cross sectional configuration to surround three edges of anode 20 to provide conductive connection and support for capacitors C2 and C3 and connection and support for one end of inductor L2. One end of the inductor L2 of the pi filter may be connected and supported by conductor 30. The other end of inductor L2 is connected to one plate of capacitor C4. The bottom wall of shield 22 may serve as the other plate of capacitor C4. If desired a separate capacitive plate (not shown) could be provided. Insulators 43 and 44 may be connected between conductive portion 30 and the plate of stage V1. As shown in FIG. 5, the circuit is enclosed by shield 22 except for the openings A and B of waveguide ducts 20 and 21 through which the work material (not numbered) enters and leaves respectively.

Since configuration of many elements is similar in FIGS. 2, 3 and 4, explanation of the structure of FIGS. 3 and 4 will be limited to dissimilarities as compared to the embodiment of FIG. 2 which dissimilarities are introduced to show the solution to problems which these embodiments provide.

Now, continuing with operation of the device of FIG. 2, material may be fed to be introduced into the work circuit between the plates of capacitor C4. Capacitor C4' of the FIG. 3 embodiment and capacitor C4'' of the FIG. 4 embodiment provide the work circuits for those embodiments similarly.

The material may enter and leave by a continuous process or by interrupted movement. By restricting the size of the ducts 20 and 21 at A and B to practical dimensions they can be made to operate as wave guides with the operating frequency being lower than the wave guide cut-off frequency. Because the operating frequency is lower than the wave guide cut-off frequency there is severe attenuation to power transfer through the wave guide so that if the wave guide has sufficient length, radiation from the circuit through the wave guide ducts 20 and 21 and out of apertures A and B can be reduced to a negligible value. That is, substantially no radiation of energy from the circuit through the wave guides 20 and 21 and their openings A and B occurs due to severe attenuation because the wave guide cut-off frequency is above the operating frequency of the circuit. In cases where the heating process need not be continuous but instead is interrupted, the openings at A and B may be closed during operation and radiation from the source will then be minimized further. For example, flaps (not shown) could be provided to shut the openings at A and B periodically to eliminate radiation during heating of the work.

Some materials have a high dielectric power factor at low RF frequencies. In such materials the RF losses in the material are high when it is placed in an RF field (radio frequency). Such materials are relatively easy to heat because of this power dissipation in the materials. However, other materials have a very low dielectric power factor. For such materials dielectric heating presents a more difficult problem. If the radio frequency field is increased in intensity for the purpose of increasing the losses and therefore the heating rate, a value of field intensity may be reached at which damaging arcs may occur between the work area plates and the material or within the material itself depending upon characteristics such as structure and composition. Arcing across dielectric materials such as food or other perishable dielectric material causes severe damage or destruction. Fortunately, the power factor of many materials increases as the frequency increases, making dielectric heating practical because sufficient power can be generated and transmitted to the work circuit at higher frequencies.

This problem may be solved by providing means for increasing the oscillator frequency at will in accordance with the necessity for higher frequency without decreasing the power below the point of effectiveness.

When large vacuum tubes capable of generating sufficient power to make the heating process practical are used in a circuit such as shown in FIG. 1 and the inductor L2 is a coil, the frequency of operation is limited to the frequency at which the coil disappears. That is the coil must be made with fewer turns or smaller diameter as the frequency is increased. Referring to FIG. 3 as the frequency goes up to the point where the coil L2 becomes a straight connection between capacitors C3 and C4 it degenerates into a coaxial transmission line having a surge impedance determined by the cross-sectional dimensions of the connection (which forms the inner conductor) and the cross-sectional dimensions of the circuit shield or wall (which is the outer conductor of the coaxial cable or transmission line). This "transmission line" functions as an inductor to permit operation at frequencies higher than obtainable with a coil.

By surge impedance is meant an impedance wherein an infinite line is presented looking from the generator into the load. The infinite line absorbs all energy without reflection back into the generator.

Standing waves occur when the impedance of the transmission line is not equal to or matched to the impedance of the load so that part of the energy is reflected from the load back along the transmission line. If the impedance of the transmission line matches that of the load, the load seems like another length of transmission line to the radio frequency waves and all of the wave energy passes into the load. That is, the load absorbs the energy just as fast as the transmission line supplies it.

In the embodiment of FIG. 3 it is desirable to couple substantially all of the energy at very high frequency into the capacitive load in capacitor C4'. Therefore, a resonant line is needed. As the freqency goes up a lower value of inductance is required. The most practical and feasible line of low inductance is a section of conductive transmission line. In the FIG. 3 embodiment the transmission line is shown operating unterminated or in the resonant condition. Actually the inner conductor may take the form of a pipe (copper pipe).

The equivalent "inductance" of the transmission line is a function of its length and its surge impedance. If the capacitance of capacitors C3 and C4 (see FIG. 1) remain constant, increasing length of the transmission line decreases frequency and decreasing surge impedance of the transmission line increases frequency. Decreasing surge impedance means decreasing the ratio of the cross-sectional dimension of the circuit shield 22' to the cross-sectional dimension of the inner conductor 31. When the inner conductor 31 is therefore increased in size, the currents which flow on its surface have a greater surface area to flow over and the current concentration is reduced. This results in less resistance loss and the circuit therefore has a lowered loss factor or greater "Q". As the resistance of a tuned circuit is mainly in the coil (in the transmission line in the case of high frequency), the highness of the ratio of the inductive reactance of a coil to its resistance is a measure of the efficiency or quality of the coil. This ratio is also a measure of the quality or figure of merit of the circuit wherein $$Q=\frac{X_L}{R}$$

$X_L$ being the inductive reactance of the coil and R being the resistance. By proper choice of length and surge impedance of the transmission line of FIG. 3, in accordance with the desired frequency of operation, the circuit Q can be increased in value so as to retain good overall efficiency of operation with increasing frequency.

As shown in the circuit configuration of FIGS. 2, 3, and 4 and referring to the center line of FIG. 4 the construction of the plate circuit is symmetrical about a vertical axis through the center of the work circuit area. Radio frequency currents which flow to the capacitor C4 or C4' or C4'' do so essentially with equal distribution around its circumference resulting in an essentially equal voltage throughout the work circuit area.

Referring to FIGS. 3 and 4 as operation frequencies become higher the concentricity becomes more important as without the symmetrical structure of the invention standing waves and unequal heating across the dielectric would occur.

The principles of the invention may be extended to operation at very high frequencies and operating power into a range where suitable individual power tubes are not suitable or available. This may be done by utilization of smaller high frequency tubes connected in parallel. Such smaller tubes operate efficiently at high frequency. Such high frequency tubes operate usually at relatively low plate voltages. Therefore, when several tubes are operated in parallel to obtain high power output, the load impedance presented to the tubes must be relatively low. The embodiment of FIG. 4 illustrates such a circuit which utilizes the advantages of the impedance transforming characteristics of the inventive circuit and its ability to multiply voltage. The symmetrical construction of grouping the tubes symmetrically as shown or in a circle or ring permits all tubes to operate in the same manner for successful parallel operation.

Referring further to FIG. 4 a plurality of tubes (in this figure two tubes) may be concentrically or symmetrically disposed about an axis Z—Z. The plates of the tubes, the grids and the filaments respectively may be connected together in plate connected to plate, grid connected to grid and filament connected to filament arrangement. The parallel tube arrangement permits higher current flow. The circuit can multiply voltage in accordance with the ratio of the surge impedances of the sections.

Now referring to FIG. 4 in detail two stages V11 and V21 may be provided and disposed in symmetrical relationship with respect to axis Z—Z of a solid metal shield 40. A grid circuit including inductor L3'' which may actually be a transmission line may be disposed between the connected together grids of stages V11 and V21 and ground. Disposed between the anodes which are connected together of stages V11 and V21 and a source of high voltage 13'' may be an inductor L1'' (choke). A grid bypass capacitor C1'' may be provided and may be disposed between inductor L3'' and the grids of stages V11 and V21. Negative bias may be supplied from source 51 through an inductor L4. A plate bypass capacitor C2'' may be disposed between the joined plates of tubes V11 and V21 and the inductor L2'' which at this high frequency may comprise transmission line elements. A capacitor C4'' may be provided having an upper plate of substantially disc-like shape connected to inductor (line) L2''. The other plate of capacitor C4'' may be the bottom wall 60 of the shield 40. As shown in FIG. 5 the work may travel through the work area defined between the plates through entrance A and exit B of waveguide extensions 20 and 21 (see FIG. 5) terminating in shield apertures (not numbered) in the side walls of shield 40 at the lower extremity thereof between the tube capacitor plates of capacitor C4''. Within the shield 40 an upper reduced portion which comprises a low surge impedance section 41 and an increased cross-sectional dimension high surge impedance section 42 may be provided. As hereinbefore stated the ratios of surge impedances of sections 41 and 42 determines the circuit's ability to multiply voltage.

In this embodiment the low surge impedance section takes the place of capacitor C3 of the FIG. 1 and FIG. 2 embodiment. That is at high frequencies the distributed capacitance of the transmission line itself of the low surge impedance section has sufficient capacitance to per-form as capacitor C3. The embodiment of FIG. 4 enables the ratio surge impedance of the high surge impedance section to the surge impedance of the low surge impedance section to allow multiplication of voltage providing that the capacitive reactance is at the proper value with respect to the surge impedance of the low surge impedance section and provided that the capacitive reactance of capacitor C4 is in required desired relationship with respect to the impedance $Z_0$ of the high surge impedance section. This assumes that the low surge impedance section is equal in electrical length to the electrical length of the high surge impedance section. The high surge impedance section is separated from the low surge impedance section by a plate bypass capacitor C2″.

The grid circuit inductor L3″ actually is a transmission line which may comprise an inner conductor 66 which may be a pipe and the portion of shield 40 surrounding it. Adjustment of length of the coaxial line L3″ to form a shorted section may be made in accordance with frequency by a shorting disk 65 which as shown provides a vertically variable section of coax line by virtue of its position along inductor L3″.

In the FIG. 4 parallel tube circuit transmission line elements are used in both the plate and grid circuits. For purposes of symmetry, the circuit above the blocking or bypass capacitor C2 may be circular (or hexagonal, etc.) in construction. As long as the construction of the capacitor is symmetrical any type of shape which provides a symmetrical arrangement such that each tube sees the same impedance is suitable. The section shown below plate bypass capacitor C2 may be square in cross section if preferred.

Assume that in the circuit of FIG. 4 the ratio of the surge impedance of the high surge impedance section 42 to the surge impedance of the low surge impedance section 41 is five. This is merely arbitrary for purposes of explanation. Also let it be assumed that the reactance of the combined plate to filament capacitance C (capacitive reactance $X_C$) of the tubes (plus stray capacitance) is equal to the surge impedance $Z_0$ (Lo) of the low surge impedance section and the reactance of the capacitance of the work area (capacitive reactance $X_{C4''}$) is equal to the surge impedance $Z_0$ (hi) of the high surge impedance section. Expressed mathematically, this assumes that $X_C = Z_0$ (Lo) or $Z_{LO}$ and $X_{C4''}$ is equal to $Z_0$ (hi) or Z hi. If the electrical length of each transmission line is equal (hi=lo), each will be ⅛ wave length long at the resonant frequency. There must be a 180° phase shift across a pi network. Each section equals ninety degrees (90°) electrically and 90° equals ¼λ (lambda) or one quarter of the wave length. Under these conditions the radio frequency (RF) voltage in the work circuit area will be five times the voltage generated at the tube anodes.

This is evident from the following:

The radio frequency current at the junction of the low and high impedance sections is:

$$I = \sqrt{2} \times \frac{E_t}{Z_L} \qquad (1)$$

where:

$I$=radio frequency (RF) current at the junction
$E_t$=radio frequency (RF) voltage at the tube anode
$Z_L$=surge impedance of the low impedance section Also $$E_w = \frac{Z_{Hi} I}{\sqrt{2}} \qquad (2)$$

where:

$E_w$=RF voltage in work area and:

$Z_{Hi}$=surge impedance of the high impedance section

Substituting:

$$\sqrt{2} \times \frac{E_t}{Z_L}$$

for I in Equation 2 gives:

$$E_W = \frac{Z_H}{Z_L} \times E_t \qquad (3)$$

Now since the ratio of $Z_{Hi}$ to $Z_{Lo}$ was assumed equal to 5, substituting in Equation 3 gives:

$$E_w = 5 \times E_t$$

That is, the work circuit voltage is five times the tube anode voltage (for other ratios and reactance values, conventional transmission line equations which may be found in Terman or Everett on Radio Engineering will apply).

The above shows the multiplying advantage of the embodiment of FIG. 4.

In summary, the invention of this application teaches a method and apparatus employing a power oscillator and associated work circuits for industrial dielectric heating wherein means are provided for adjusting the work circuit radio frequency voltage over a very wide range including voltages of greater value than those normally obtained in a radio frequency generator and wherein means are provided for matching the load circuit to the radio frequency generator for maximum power transfer and optimum efficiency because of pi filter output network construction which the ratio of capacitance reactance values of capacitors can be changed, wherein circuit shielding with resulting low external radiation of radio frequency energy resulting from the construction and dimensioning of wave guide ducts at the entrance and exit of the work in conjunction with shielding to prevent radiation of radio frequency energy and consequent loss, wherein efficient transfer of energy from the radio frequency generator to the work circuit due to high Q circuitry is provided because of proper choice of length and surge impedance of the transmission media, wherein excellent uniformity of radio frequency voltage throughout the work circuit area is provided because of symmetry of the mechanical configuration, wherein obtaining high power output in a work circuit at high frequencies is provided by operation of radio frequency generating tubes in parallel in a configuration providing for desired ratio of work circuit voltage to anode voltage in accordance with ratio of impedance of a high surge section to impedance of a low surge section separated therefrom by a plate bypass capacitor, and wherein simplicity of adjustment and operation may occur since only the plate and grid circuits of an oscillator are involved and there are no coupled circuits with their attendant needs for adjustment during operation.

The invention solves the problems of generating sufficient power in operating a power oscillator circuit at high frequency and of coupling that high frequency energy with minimum loss of energy in transmission to a device to radiate the power into the object which is to be attacked by high power radiation. The pi network of the invention operates to match the impedance of the load $R_2$ to the plate impedance $R_P$ of the oscillator to thereby provide for optimum transmission of power. To effect impedance matching, the ratio of capacitor C3 to capacitor C4 (or corresponding capacitors) in the pi filter is made to correspond to the ratio of plate resistance to load resistance, if plate resistance is low the capacitance of capacitor C3 can be made so as to provide relatively low capacitive reactance at the operating frequency with respect to that of capacitor C4 and if the load resistance is relatively high with respect to the plate resistance capacitances of capacitors C3 and C4 can be such that the ratios of capacitive reactances of capacitor C3 to C4 at the operating frequency are relatively high to get optimum impedance matching. The two capacitor plates of capacitor C4 load with the work therebetween form a portion of the pi network.

Shielding is effected by an enclosure with work entrance and egress ducts which are dimensioned to be below the cut off frequency of operation. The ducts are of length such that at the wave guide cut off frequency substantially complete attenuation takes place within the duct. The mechanical construction of the inventive device is symmetrical about a central axis to eliminate unbalance which would otherwise cause standing waves and therefor unequal heating over the work surface of the dielectric. The embodiment of FIG. 4 provides a group of tubes in parallel utilizing the more efficient operation at low plate voltage of smaller tubes to provide high power output at high frequency and increasing the current load which can be handled because of greater current handling capacity of a plurality of tubes in parallel. The pi filter of the invention permits load impedance presented to the tubes to be made relatively low which is required by this embodiment.

The invention may be applied to use as an amplifier instead of an oscillator as follows:

Instead of the work comprising a dielectric material applied through the pi filter load capacitor C4, etc., an output load may be disposed across capacitor C4 comprising a coaxial line leading to a transmitter wherein the inner cable of the coaxial line is tied to the upper plate of capacitor C4 and the outer conductor is grounded.

While a specific embodiment of the invention has been shown and described, it should be recognized that the invention should not be limited thereto. It is accordingly intended in the appended claims to claim all such variations as fall within the true spirit of the invention.

What is claimed is:

1. Industrial dielectric heating apparatus comprising a tuned grid, tuned plate, vacuum tube power oscillator, output means responsive to radio frequency energy from said oscillator, said output means comprising a pi network comprising a first and a second capacitor, said second capacitor comprising a pair of plates and a dielectric disposed therebetween, said dielectric comprising a load which is to be heated by the apparatus the capacitive reactances of said second capacitor to said first capacitor of said pi network being proportioned to match the output load resistance to the plate resistance of said oscillator to thereby provide for optimum transmission of power wherein the output load will appear to the plate resistance of the tube as a proper terminating impedance.

2. A power oscillator and associated work circuit for heating of a dielectric material, said oscillator comprising a tuned-grid, tuned-plate vacuum tube stage, said work circuit comprising a pi filter arrangement, D.-C. blocking capacitor means to bypass RF to said pi filter to said vacuum tube, said pi filter comprising a first and second capacitor and an inductor, the dielectric material being the load to be operated upon by the work circuit and being disposed between the plates of said second capacitor, the capacitive reactance of the first capacitor as compared to the second capacitor which determines the relationship of the load resistance to the tube anode resistance being of predetermined ratio for optimum impedance matching at desired frequency of operation in accordance with the nature of the load material, said oscillator causing a high gradient radio frequency electric field to exist between the plates of said second capacitor, the rate of power transfer to the material being a function of the voltage between the plates of the second capacitor, and the voltage being a function of the impedance relationships of load to anode resistance.

3. A power oscillator circuit for dielectric heating comprising a vacuum tube power oscillator and a pi filter, said pi filter comprising a capacitor having plates between which the dielectric material is heated, said pi filter comprising an inductor disposed between said vacuum tube oscillator and said capacitor, said inductance comprising a straight connection between the capacitors of said pi filter in accordance with the operation of said oscillator at high frequencies, a cylindrical shield forming shell of conductive material surrounding said straight connection, said inductor and said shield forming a coaxial transmission line having a surge impedance determined by the cross-sectional dimension of the connection and the cross-sectional dimensions of the circuit shield, the ratio of the cross-sectional dimension of the circuit shield to the cross-sectional dimension of the inner conductor being such as to obtain surge impedance to operate at desired frequency length of said transmission line and said surge impedance being such as to obtain the desired frequency of operation, and increase circuit Q to a value for optimum overall efficiency of operation.

4. The apparatus of claim 3 wherein said circuit is substantially disposed within said shield in concentric symmetrical relationship with respect to a vertical axis through the center of the work circuit area bounded by the plates of said capacitor such that radio frequency current flowing to said capacitor flows with substantially equal distribution around the circumference of said capacitor to thereby provide equal voltage throughout the work circuit area.

5. A dielectric heating device comprising a unilateral current flow power oscillator device, a pi filter network, means to couple said pi filter network being disposed in the output circuit of said power oscillator, said pi filter network comprising a first capacitor and a second load receiving capacitor, the capacitive reactances of said capacitors in the pi filter network being of ratio such that proper impedance match between the anode resistance of the oscillator and of the load between the load receiving capacitor is provided, said power oscillator comprising a plnurality of radio frequency energy generating tubes disposed in parallel to attain relatively high power output at high frequencies, said tubes being symmetrically arranged to group the tubes in a ring, the plates, grids and filaments of said tubes being tied together to thereby provide relatively high current flow with relatively low plate voltages.

6. The apparatus of claim 5 wherein the plate and grid circuit impedances are transmission line elements, said apparatus comprising a low surge impedance section, a high surge impedance section, a plate bypass capacitor separating said sections, said high surge impedance section and said low surge impedance sections being of respective symmetrical geometric cross-sectional configuration, the ratio of the surge impedance of said high surge impedance section being in predetermined multiplied relationship to the surge impedance of the low impedance section to thereby provide work circuit voltage which is a multiple of tube anode voltage.

7. The apparatus of claim 6 wherein the reactance of the combined plate of filament tube plus stray capacitances is equal to the surge impedance of the low surge impedance section and the reactance of the capacitance of the area between the load capacitor plates is equal to the surge impedance of the high surge impedance section and the electrical lengths of the transmission line sections are equal.

8. Means for performing dielectric heating, said means comprising a plurality of tubes in ring array, an output circuit for such tubes comprising a low surge impedance section of a first electrical length, a plate bypass capacitor, a high surge impedance section of electrical length equal to said low surge impedance section and separated from said low surge impedance section by said plate bypass capacitor, a work capacitor comprising two plates surrounding a work area, the work substantially being the dielectric of said work capacitor, and means to multiply the power applied to the work area, said last-named means comprising said low surge impedance section of said first electrical length and said high surge impedance section of said electrical length equal to said low surge impedance section, the relationship between the internal capacitance of each of said tubes of said tube circuit with relation to said low surge impedance section being predetermined, the relationship between said work area capacitor capacitive reactance and the surge impedance of said high surge impedance section being predetermined such that the impedance of said high surge impedance section with respect to the impedance of said low surge impedance section will be a function of the multiplication of voltage and power between the tube output and the work area.

References Cited in the file of this patent

UNITED STATES PATENTS

| | | |
|---|---|---|
| 2,756,314 | Blok | July 24, 1956 |
| 2,763,758 | Kohler | Sept. 18, 1956 |
| 2,783,344 | Warren | Feb. 26, 1957 |
| 2,868,939 | Pound | Jan. 13, 1959 |
| 2,944,133 | Tibbs | July 5, 1960 |
| 2,952,819 | Zablocki | Sept. 13, 1960 |